United States Patent
Okumura et al.

(10) Patent No.: US 7,971,345 B2
(45) Date of Patent: Jul. 5, 2011

(54) RECONSTITUTED BATTERY PACK, RECONSTITUTED BATTERY PACK PRODUCING METHOD, RECONSTITUTED BATTERY PACK USING METHOD, AND RECONSTITUTED BATTERY PACK CONTROL SYSTEM

(75) Inventors: Motoyoshi Okumura, Chiryu (JP); Katsunori Maegawa, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 576 days.

(21) Appl. No.: 12/216,301

(22) Filed: Jul. 2, 2008

(65) Prior Publication Data
US 2009/0013521 A1 Jan. 15, 2009

(30) Foreign Application Priority Data
Jul. 10, 2007 (JP) ................................. 2007-180749

(51) Int. Cl.
*H01M 10/14* (2006.01)
*H01M 10/38* (2006.01)
(52) U.S. Cl. ........................................ 29/730; 429/123

(58) Field of Classification Search .................... 29/730; 429/123, 149
See application file for complete search history.

(56) References Cited

FOREIGN PATENT DOCUMENTS
| JP | A-2004-185915 | 7/2004 |
| JP | A-2006-79961 | 3/2006 |

*Primary Examiner* — Jennifer K. Michener
*Assistant Examiner* — Carlos Barcena
(74) *Attorney, Agent, or Firm* — Oliff & Berridge, PLC

(57) ABSTRACT

A reconstituted battery pack producing method comprises an obtaining process for obtaining, by use of one of a first charged-state control device having ever controlled a charged state of a used battery pack when it was used before and a second charged-state control device arranged to control the charged state of the used battery pack as with the first charged-state control device, a reference-time charge amount charged in each used secondary battery constituting the used battery pack; a selecting process for selecting more than one of the used secondary batteries close to each other in the reference-time charge amount from a group of the used secondary batteries whose reference-time charge amounts have been obtained; and an assembling process for combining and assembling the selected used secondary batteries into a new reconstituted battery pack.

5 Claims, 10 Drawing Sheets

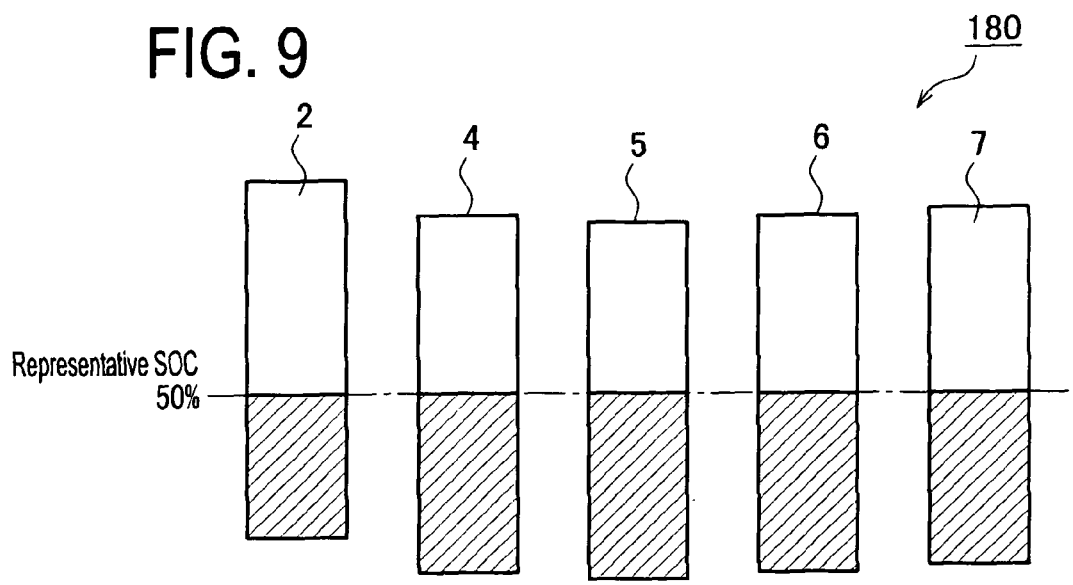
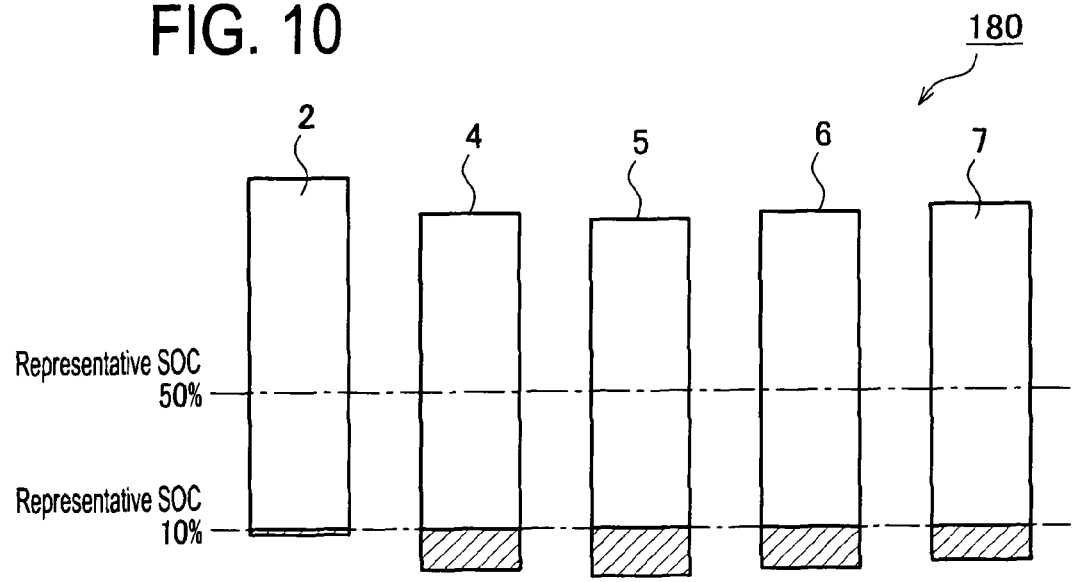

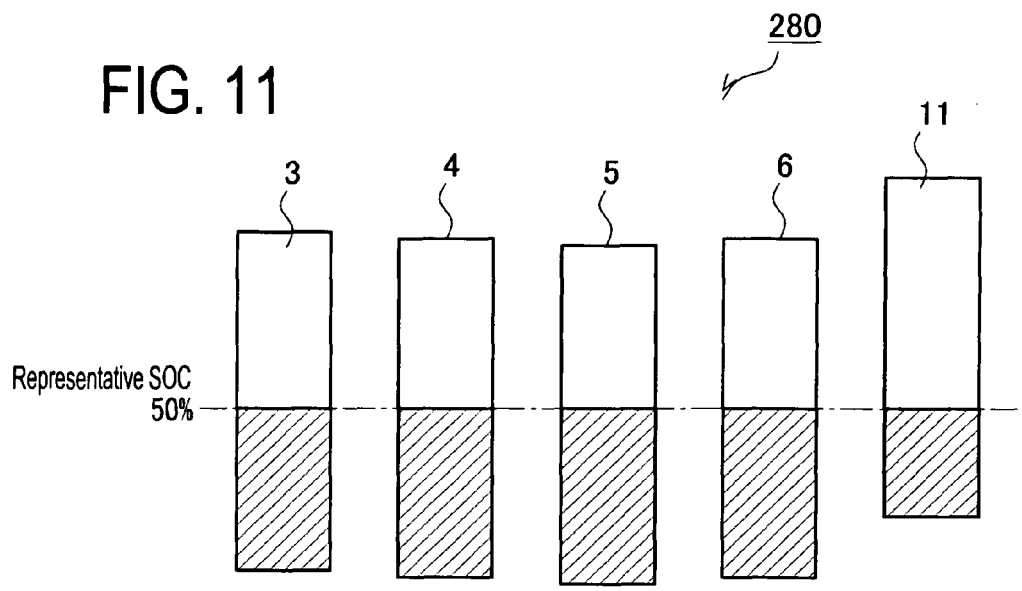
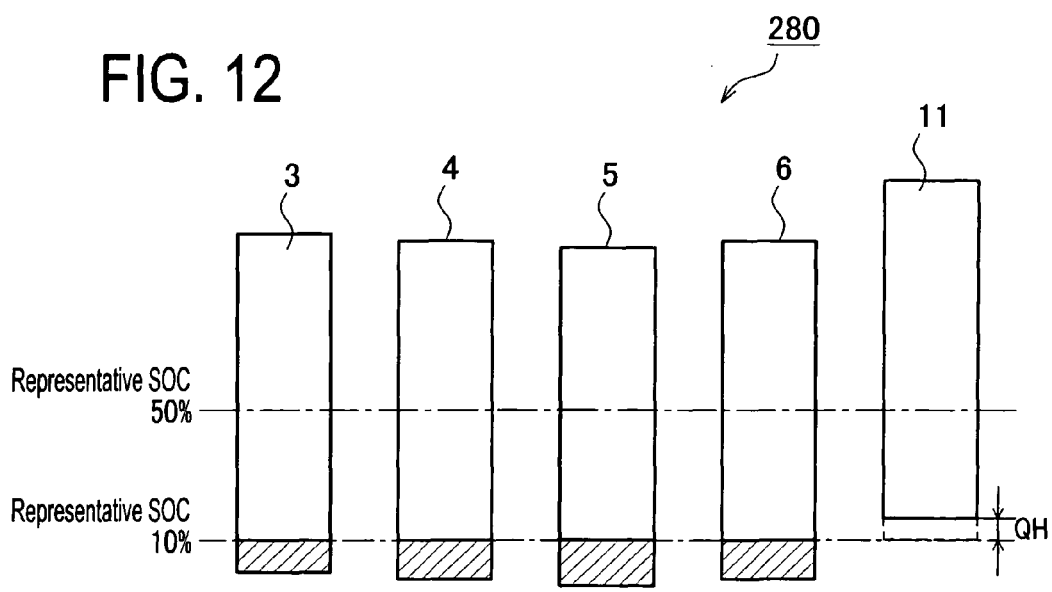

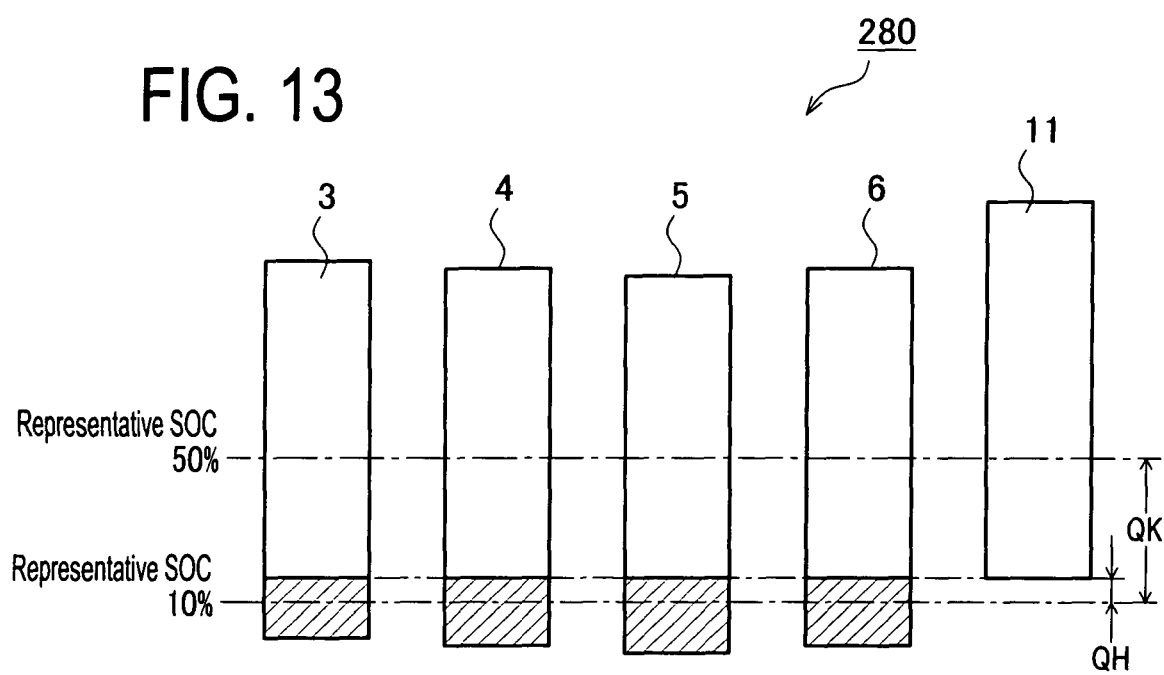

RECONSTITUTED BATTERY PACK, RECONSTITUTED BATTERY PACK PRODUCING METHOD, RECONSTITUTED BATTERY PACK USING METHOD, AND RECONSTITUTED BATTERY PACK CONTROL SYSTEM

BACKGROUND OF THE INVENTION

1. Field of the Invention

The present invention relates to a reconstituted battery pack, a reconstituted battery pack producing method, a reconstituted battery pack using method, and a reconstituted battery pack control system.

2. Description of Related Art

Recently, various secondary batteries have been proposed as the power source for portable devices and mobile devices or as the power source for electric vehicles or hybrid electric vehicles. When the secondary batteries are used as the power source for electric vehicles or hybrid electric vehicles, high output power is demanded and hence a plurality of secondary batteries are electrically connected in series to be used as a battery pack.

However, in the battery pack used as the power source for electric vehicles or hybrid electric vehicles, one or more of the secondary batteries constituting the battery pack are often broken earlier than other batteries due to environments of use, characteristic difference among individual secondary batteries of the battery pack, or troubles of component parts of each secondary battery. As a result, the intended performance of the battery pack may not be exhibited, which may cause the entire system failure. To solve such problems, a secondary battery broken earlier than other batteries must be replaced with a normal secondary battery. Various methods have been proposed for replacing the secondary batteries (see, for example, JP2004-185915A).

JP2004-185915A discloses a method of replacing secondary batteries of a battery pack in which a plurality of secondary batteries are electrically connected in series or in parallel. According to this method, when a certain defective secondary battery is to be replaced with a new secondary battery for exchange, a charge amount of the new secondary battery is controlled to be smaller than charge amounts of other batteries not to be replaced (normal secondary batteries of the battery pack). Specifically, the new secondary battery is charged so that the charge amount thereof may be 5% to 20% smaller than the charge amounts of other normal batteries not to be replaced. As a result, according to JP'91 A, when charging and discharging are repeated during use of the battery pack, the difference in charge amount (the charged electric quantity) between the new secondary battery and other existing batteries becomes smaller, and hence the charge amounts of secondary batteries of the battery pack become equal. It is also said that the performance of the battery pack can be exhibited to a maximum extent.

Even when electric vehicles or hybrid electric vehicles are to be deregistered or scrapped, the battery packs mounted thereon may still be in a usable state. Further, even in the case where the battery pack is replaced with a new battery pack due to defective one(s) of the secondary batteries of the battery pack, the other secondary batteries in the discarded battery pack may still be in a usable state. A new technique is therefore demanded for re-using the usable secondary batteries without discarding, that is, usable secondary batteries among secondary batteries used and collected from the market (hereinafter, also referred to as "used secondary batte y(s)"). For example, there is a demand for a technique of producing a new battery pack by collecting used battery packs from scrapped vehicles or the like and combining usable secondary batteries (used secondary batteries) contained in those collected used battery packs.

However, the collected used secondary batteries contain those used in various environments and thus battery characteristics are often largely different from battery to battery. Such difference in battery characteristics may cause some problems when a battery pack is produced by combining the used secondary batteries. For example, one or more of the used secondary batteries constituting the battery pack may be overcharged or overdischarged and the performance of the used secondary batteries of the battery pack may not be exhibited sufficiently. JP'91 A and others disclose various techniques for replacing one or more of secondary batteries constituting the battery pack (defective secondary batteries) with new and normal secondary batteries. However, such techniques could not be applied in the technique of producing a new battery pack by combining used secondary batteries.

SUMMARY OF THE INVENTION

The present invention has been made in view of the above circumstances and has an object to provide a reconstituted battery pack, a producing method thereof and a using method thereof, and a reconstituted battery pack control system capable of preventing defects such as overcharge or overdischarge in one or more of used secondary batteries constituting a reconstituted battery pack, and sufficiently exhibiting the performance of each used secondary battery of the reconstituted battery pack.

To achieve the above object, the invention provides a method of producing a reconstituted battery pack, comprising: an obtaining process for obtaining a reference-time charge amount charged in each of used secondary batteries constituting a used battery pack when a representative SOC of the used battery pack is controlled to a predetermined reference value with use of a charged-state control device arranged to calculate the representative SOC estimated to be representative of SOCs of secondary batteries constituting the battery pack, and arranged to control a charged state of the battery pack so that the representative SOC becomes the predetermined reference value, the charged-state control device being one of a first charged-state control device having ever controlled the charged state of a used battery pack when this battery pack was used before and a second charged-state control device arranged to control the charged state of the used battery pack as with the first charged-state control device, a selecting process for selecting more than one of the used secondary batteries close to each other in the reference-time charge amount from a group of the used secondary batteries used in one or more of the used battery packs, the reference-time charge amount of each used secondary battery having been obtained; and an assembling process for combining and assembling the selected used secondary batteries into a new reconstituted battery pack.

There is a technique for controlling a charged state of a battery pack so that a representative SOC estimated to be representative of SOCs of the secondary batteries constituting the battery pack (e.g. an average of estimated SOCs of the secondary batteries) becomes a predetermined "reference value (e.g. 50%)" by a charged-state control device (a battery controller, an ECU, etc.). Specifically, for example, in the case where the battery pack is used as a power source of a hybrid electric vehicle, the SOC of each secondary battery constituting the battery pack is controlled in order to enhance vehicle fuel consumption efficiency. At that time, the charged-state control device controls the charged state of each secondary battery so that the representative SOC becomes the reference value in order to optimally perform power assist by motor drive during vehicle acceleration and energy recovery (regenerative braking) during deceleration. When the representative SOC is less than the "reference value", for instance, the control of giving more charge than discharge is executed to cause the representative SOC to approach the "reference value". To the contrary, when the representative SOC exceeds the "reference value", the control of giving more discharge than charge is executed to cause the representative SOC to approach the "reference value". Such SOC controls can achieve efficient use of the battery pack and hence improve vehicle fuel consumption efficiency.

In the case of executing the aforementioned SOC control, accordingly, the secondary batteries constituting the battery pack will often vary in a range centering on a charge amount (a reference-time charge amount) corresponding to the representative SOC equal to the predetermined "reference value".

Here, it is assumed to use a reconstituted battery pack assembled by combining a used secondary battery(s) with a relatively large "reference-time charge amount (Ah)" and a used secondary battery(s) with a smaller "reference-time charge amount (Ah)" than the former. For instance, if the used secondary batteries constituting this reconstituted battery pack are simultaneously discharged by an equal electric quantity, the used secondary battery(s) with a small "reference-time charge amount" may be overdischarged. During charging, to the contrary, the used secondary battery(s) with s large "reference-time charge amount" may be overcharged.

Under control of preventing overcharge and overdischarge of each used secondary battery, the used secondary battery(s) with the small "reference-time charge amount" comes to a fully discharged state earlier than the used secondary battery(s) with the large "reference-time charge amount". Thus, the electric quantity available in the used secondary battery(s) with the large "reference-time charge amount" is restricted. During charging, to the contrary, the used secondary battery(s) with the large "reference-time charge amount" comes to a fully charged state earlier than the used secondary battery(s) with the small "reference-time charge amount". Accordingly, the electric quantity available in the used secondary battery(s) with the small "reference-time charge amount" is restricted. Due to such restriction in electric quantity available in each used secondary battery, each battery may not exhibit sufficient performance.

According to the producing method of the invention, on the other hand, the obtaining process includes obtaining the "reference-time charge amount" of each used secondary battery when the representative SOC of the used battery pack becomes the reference value by the first charged-state control device having ever been used in the used battery pack or the second charged-state control device capable of making the same control as the first charged-state control device. From the group of used secondary batteries having ever been used in one or more used battery packs, the "reference-time charge amounts" of which have been obtained, more than one of the batteries close to each other in the "reference-time charge amount" are selected and recombined to assemble a new reconstituted battery pack.

Accordingly, in the case where the charged-state control device that makes control as with the first charged-state control device (or the second charged-state control device) controls the charged state of the relevant reconstituted battery pack for use, a difference in charge amount between the used secondary batteries during charging/discharging can be reduced. This is because, as mentioned above, the charge amount of each battery constituting the battery pack will often vary in a range centering on the reference-time charge amount. It is therefore possible to restrain defects such as overcharge or overdischarge of one or more of the used secondary batteries constituting the reconstituted battery pack. Furthermore, the electric quantity available in each used secondary battery constituting the reconstituted battery pack can be increased, so that the performance of each battery can be sufficiently exhibited.

It is to be noted that "SOC" is an abbreviation of a State of Charge, representing the charged state (%) of a secondary battery.

Further, "the second charged-state control device arranged to control the charged state of the used battery pack as with the first charged-state control device" indicates a charged-state control device arranged to calculate a representative SOC of the used battery pack in the same manner as the first charged-state control device, and arranged to control the charged state of each used secondary battery so that the representative SOC becomes a reference value equal to that of the first charged-state control device.

The obtaining process may includes obtaining the "reference-time charge amount" of each used secondary battery by measuring the "reference-time charge amount" of each battery constituting the used battery pack. As an alternative, the used secondary batteries whose "reference-time charge amounts" have been measured may be adopted. In this case, the obtaining process includes knowing their "reference-time charge amounts".

For instance, the "reference-time charge amount" of each used secondary battery can be measured as follows.

In the case where the battery pack is used as a power source of a hybrid electric vehicle or the like, for example, the used secondary batteries (the used battery pack) to be measured are mounted in the vehicle together with the charged-state control device (a battery controller or the like) having ever controlled them. This vehicle is caused to run at constant speed for a predetermined time (e.g. about 30 minutes). If a vehicle allows an operator to observe the representative SOC in a driver seat, it may be made to run for a predetermined time while adjusting the displayed representative SOC to the "reference value". After that, a charged amount (a charged electric quantity) of each used secondary battery is measured. This measured charge amount can be defined as the "reference-time charge amount". In the hybrid electric vehicle if runs at constant speed for a predetermined time, the charged state of each battery is controlled so that the representative SOC becomes the "reference value".

Further, the used battery pack is combined with a battery controller or the like for estimating the representative SOC, and each used secondary battery is charged or discharged while data on the representative SOC is observed on a well known data monitor, to adjust the value of the representative SOC to the "reference value". The charged amount of each used secondary battery is then measured. Thus, the measured values thereof can be obtained as the "reference-time charge amounts".

At the time when a full charge capacity of each used secondary battery is measured by a well known technique, battery voltage corresponding to the charge amount during charging and discharging is obtained. Based on it, a battery voltage curve (during charging and during discharging) corresponding to the charge amount is created. Similarly, a battery voltage curve corresponding to the charge amount at an initial use stage of a secondary battery is also created. By comparison between the battery voltage curves (during charging and during discharging), it is possible to estimate the "reference-time charge amount" from an intermediate charge amount between a charge amount causing a maximum voltage difference in the battery voltage curve during charging and a charge amount causing a maximum voltage difference in the battery voltage curve during discharging.

In the above reconstituted battery pack producing method, furthermore, it is preferable that the reconstituted battery pack assembled in the assembling process is a reconstituted battery pack that will be used under control by any one of the first charged-state control device, the second charged-state control device, and a third charged-state control device arranged to control a charged state of the reconstituted battery pack as with the first and second charged-state control devices.

It is to be noted that "the third charged-state control device arranged to control a charged state of the reconstituted battery pack as with the first and second charged-state control devices" indicates a charged-state control device arranged to calculate the representative SOC of the reconstituted battery pack as with the first and second charged-state control devices, and arranged to control the charged state of the reconstituted battery pack so that the representative SOC becomes the reference value equal to that of the first and second charged-state control devices.

In any one of the above battery pack producing methods, preferably, the selecting process includes selecting the used secondary batteries so that a difference in the reference-time charge amount between a largest one and a smallest one of the reference-time charge amounts of the selected used secondary batteries falls within 30% of the smallest reference-time charge amount.

In the battery pack producing method, more preferably, the selecting process includes selecting the used secondary batteries so that a difference in reference-time charge amount between a used secondary battery with a largest reference-time charge amount and a used secondary battery with a smallest reference-time charge amount among the selected used secondary batteries falls within 10% of the smallest reference-time charge amount.

According to another aspect, the present invention provides a reconstituted battery pack including a plurality of used secondary batteries having ever been used and being recombined, wherein when the reconstituted battery pack is controlled by use of a charged-state control device arranged to calculate a representative SOC estimated to be representative of SOCs of secondary batteries constituting the battery pack, and arranged to control a charged state of the battery pack so that the representative SOC becomes a predetermined reference value, as to reference-time charge amounts charged in the used secondary batteries constituting the reconstituted battery pack when the representative SOC becomes the reference value, a difference in reference-time charge amount between a used secondary battery with a largest reference-time charge amount and a used secondary battery with a smallest reference-time charge amount among the used secondary batteries falls within 30% of the smallest reference-time charge amount.

The reconstituted battery pack of the invention is configured so that a difference in "reference-time charge amount" between the used secondary battery with the largest "reference-time charge amount" and the used secondary battery with the smallest "reference-time charge amount" (hereinafter, referred to as a maximum difference in reference-time charge amount) among the used secondary batteries constituting the reconstituted battery pack is within 30% of the smallest "reference-time charge amount". The maximum difference in "reference-time charge amount" between the used secondary batteries constituting the reconstituted battery pack is set small as above. Accordingly, when the reconstituted battery pack is used while its charged state is controlled by the above charged-state control device, defects such as overcharge or overdischarge of one or more of the used secondary batteries constituting the relevant reconstituted battery pack can be restrained. In addition, the performance of each used secondary battery constituting the reconstituted battery pack can be exhibited sufficiently.

In the above reconstituted battery pack, preferably, when the reconstituted battery pack is controlled by use of the charged-state control device so that the representative SOC becomes the reference value, at to reference-time charge amounts charged in the used secondary batteries constituting the reconstituted battery pack when the representative SOC becomes the reference value, a difference in reference-time charge amount between a used secondary battery with a largest reference-time charge amount and a used secondary battery with a smallest reference-time charge amount among the used secondary batteries falls within 10% of the smallest reference-time charge amount.

Further, according to another aspect, the present invention provides a using method of the reconstituted battery pack according to claim 4, the method including the step of: using the reconstituted battery pack while controlling a charged state of the reconstituted battery pack by the charged-state control device.

According to the reconstituted battery pack using method of the invention, the "reconstituted battery pack configured such that the maximum difference in reference-time charge amount between the used secondary batteries falls within 30% of the smallest reference-time charge amount" is used while its charged state is controlled by the "charged-state control device arranged to control a charged state of a battery pack so that a representative SOC becomes a predetermined reference value". Because of such use of the reconstituted battery pack, defects such as overcharge or overdischarge of one or more of the used secondary batteries constituting the relevant reconstituted battery pack can be restrained. Further, the performance of each used secondary battery of the reconstituted battery pack can be achieved sufficiently.

According to another aspect, the present invention provides a reconstituted battery pack control system comprising: a reconstituted battery pack including a plurality of used secondary batteries having ever been used and being recombined; and a charged-state control device arranged to calculate a representative SOC estimated to be representative of SOCs of secondary batteries constituting the battery pack, and arranged to control a charged state of the reconstituted battery pack so that the representative SOC becomes a predetermined reference value, wherein when the reconstituted battery pack is controlled by use of the charged-state control device so that the representative SOC becomes the reference value, as to reference-time charge amounts charged in the used secondary batteries constituting the reconstituted battery pack, a difference in reference-time charge amount between a used secondary battery with a largest reference-time charge amount and a used secondary battery with a smallest reference-time charge amount among the used secondary batteries falls within 30% of the smallest reference-time charge amount.

In the reconstituted battery pack control system of the invention, when the reconstituted battery pack is controlled by use of the charged-state control device to cause the representative SOC to become a predetermined reference value, the used secondary batteries constituting the reconstituted battery pack have the reference-time charge amounts with the maximum difference in reference-time charge amount between the batteries falls within 30% of the smallest reference-time charge amount. The maximum difference in "reference-time charge amount" between the used secondary batteries of the reconstituted battery pack is small as above. Accordingly, when the reconstituted battery pack is used while its charged state is controlled by the above charged-state control device, defects such as overcharge or overdischarge of one or more of the batteries of the reconstituted battery pack can be restrained. In addition, the performance of each used secondary batteries of the reconstituted battery pack can be exhibited sufficiently.

The reconstituted battery pack control system of the invention may include a controller-equipped reconstituted battery pack including a reconstituted battery pack and a battery controller (a charged-state control device). Further, the invention may be applied to a reconstituted battery pack control system including a reconstituted battery pack and an ECU (the charged-state control device) for various controls of a hybrid electric vehicle or the like.

In the above reconstituted battery pack control system, preferably, when the reconstituted battery pack is controlled by the charged-state control device to cause the representative SOC to become the reference value, the used secondary batteries constituting the reconstituted battery pack have the reference-time charge amounts with a difference in reference-time charge amount between a used secondary battery with a largest reference-time charge amount and a used secondary battery with a smallest reference-time charge amount among the used secondary batteries falls within 10% of the smallest reference-time charge amount.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 9 is a schematic view showing a charged state of each used second battery with a representative SOC of 50% in the reconstituted battery pack;

FIG. 10 is a schematic view showing a charged state of each used secondary battery constituting the reconstituted battery pack when discharged until the representative SOC comes to 10%;

FIG. 11 is a schematic view showing a charged state of each used second battery with a representative SOC of 50% in the reconstituted battery pack in a first comparative example;

FIG. 12 is a schematic view showing a charged state of each used secondary battery constituting the reconstituted battery pack when discharged until the representative SOC comes to 10% in the first comparative example; and FIG. 13 is a schematic view showing a charged state of each used secondary battery constituting the reconstituted battery pack when discharged until the representative SOC comes to 10% in a second comparative example.

DETAILED DESCRIPTION OF THE PREFERRED EMBODIMENTS

Embodiment 1

A detailed description of a first preferred embodiment of the present invention will now be given referring to the accompanying drawings.

Figure 1:
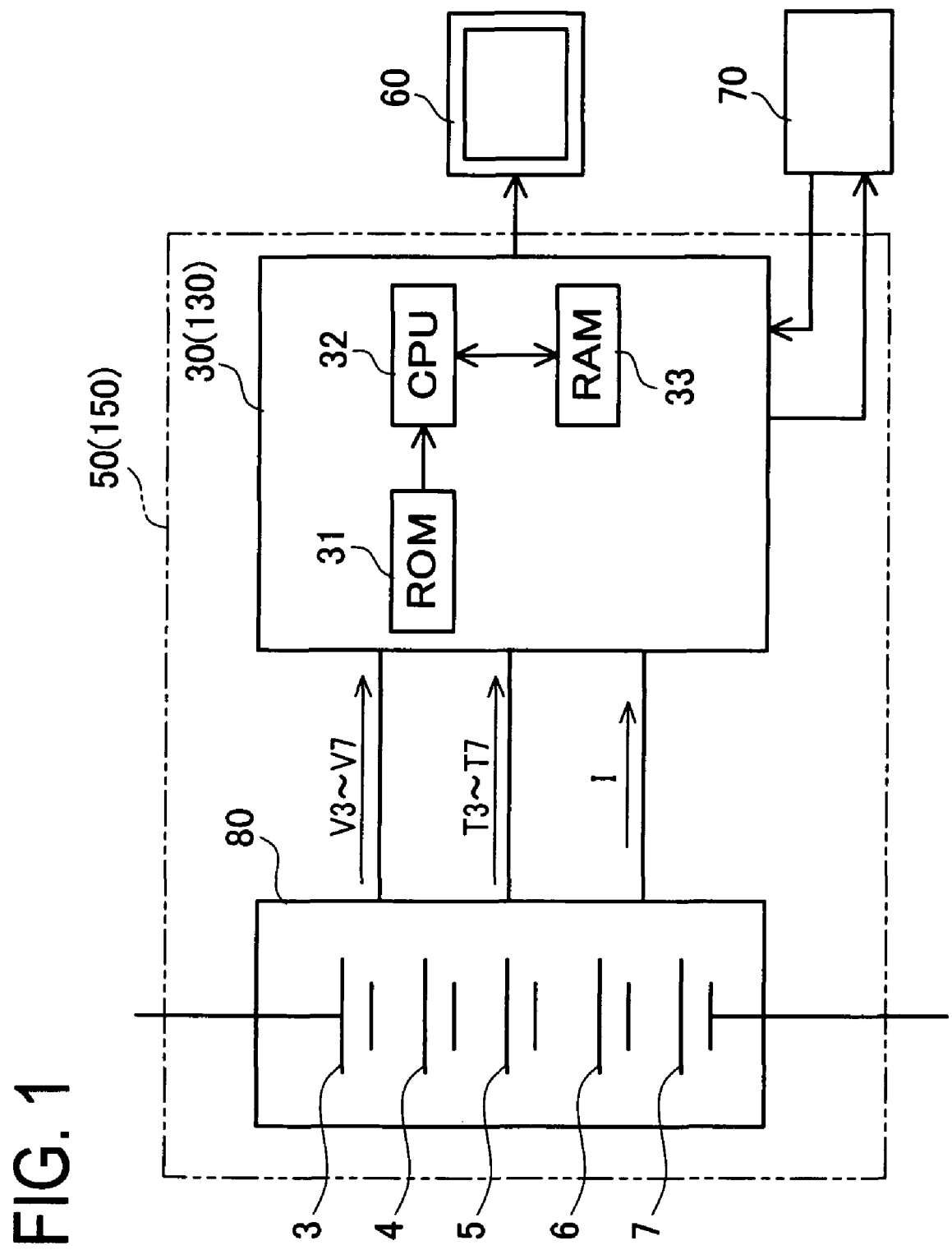
FIG. 1 is a block diagram of a reconstituted battery pack with controller in first and third embodiments.

A reconstituted battery pack 50 equipped with a controller (hereinafter, a "controller-equipped reconstituted battery pack 50") in this embodiment is first explained. The controller-equipped reconstituted battery pack 50 includes, as shown in FIG. 1, a reconstituted battery pack 80 and a battery controller 30. This controller-equipped reconstituted battery pack 50 will be mounted in for example an electric vehicle or a hybrid electric vehicle and used as the power source for these vehicles.

In the first embodiment, the controller-equipped reconstituted battery pack 50 corresponds to a reconstituted battery pack control system and the battery controller 30 corresponds to a charged-state control device.

Figure 3:
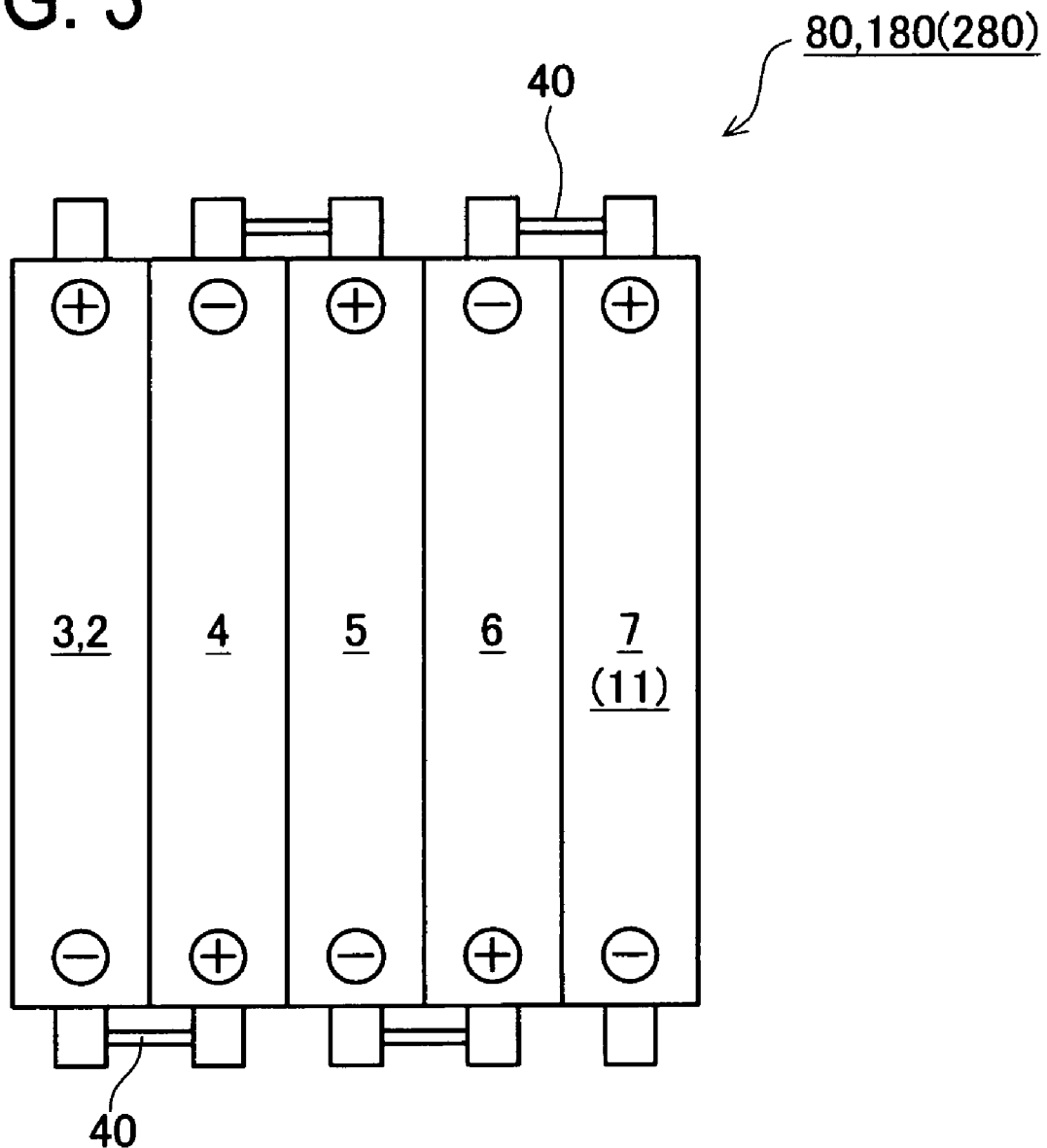
FIG. 3 is a top view of the reconstituted battery pack.

As shown in FIG. 3, the reconstituted battery pack 80 includes five used secondary batteries (used secondary batteries 3 to 7) arranged in a row and electrically connected in series by way of connection members 40. In the first embodiment, the configuration using a nickel-metal hydride secondary battery (used second batteries 1 to 20) as a used secondary battery will be explained.

The battery controller 30 is a known battery controller (see, for example, JP2006-79961A), and includes a ROM 31, a CPU 32, a RAM 33, and others. As shown in FIG. 1, the battery controller 30 is configured to detect battery voltages V3 to V7, battery temperatures T3 to T7, and current value I (in the first embodiment, the used secondary batteries 3 to 7 are connected in series and hence values of currents flowing in the used secondary batteries 3 to 7 are equal) of used secondary batteries 3 to 7 constituting the reconstituted battery pack 80. Based on these values, the charge amounts of the used secondary batteries 3 to 7 (the charged electric quantity) are estimated. Based on the charge amounts estimated as above (the estimated charge amounts), the SOC (state of charge) of each of the used secondary batteries 3 to 7 is estimated. Further, an average of the estimated SOCs is calculated as a representative SOC of the reconstituted battery pack 80.

This battery controller 30 controls a charged state of the reconstituted battery pack 80 so that a representative SOC value becomes a predetermined reference value (50% in the first embodiment). Specifically, for example, in the case where the reconstituted battery pack 80 is used as a power source of a hybrid electric vehicle, the charged state of the reconstituted battery pack 80 is controlled as mentioned above in order to enhance vehicle fuel consumption efficiency. At that time, the battery controller 30 controls the charged state of the reconstituted battery pack 80 so that the representative SOC becomes the reference value (50%) in order to optimally perform power assist by motor driving during vehicle acceleration and energy recovery (regenerative braking) during deceleration.

When the representative SOC is less than the "reference value (50%)", for instance, the control of giving more charge than discharge is executed to cause the representative SOC to approach the "reference value (50%)". To the contrary, when the representative SOC is more than the "reference value (50%)", the control of giving more discharge than charge is executed to cause the representative SOC to approach the "reference value (50%)". Such controls can achieve efficient use of the reconstituted battery pack 80 and hence improve vehicle fuel consumption efficiency.

It is to be noted that data on representative SOC calculated by the battery controller 30 can be externally ascertained by obtaining from the battery controller 30 by use of a well known data monitor 60.

Figure 4:
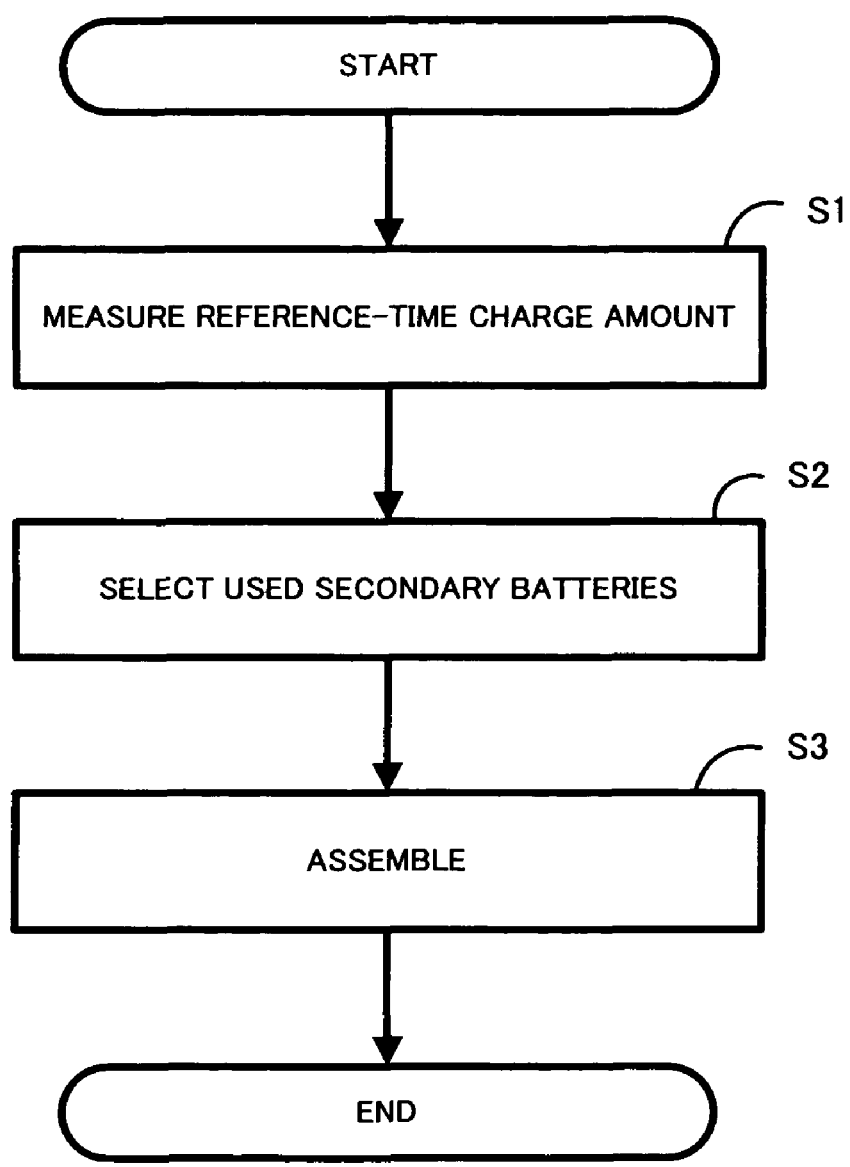
FIG. 4 is a flowchart showing the flow of a process of producing the battery pack in the first to fourth embodiments.

An explanation is given to a method of producing the reconstituted battery pack 80 of the first embodiment. FIG. 4 is a flowchart showing the flow of a producing process of the reconstituted battery pack 80 of the first embodiment.

(Obtaining Process)

Figure 5:
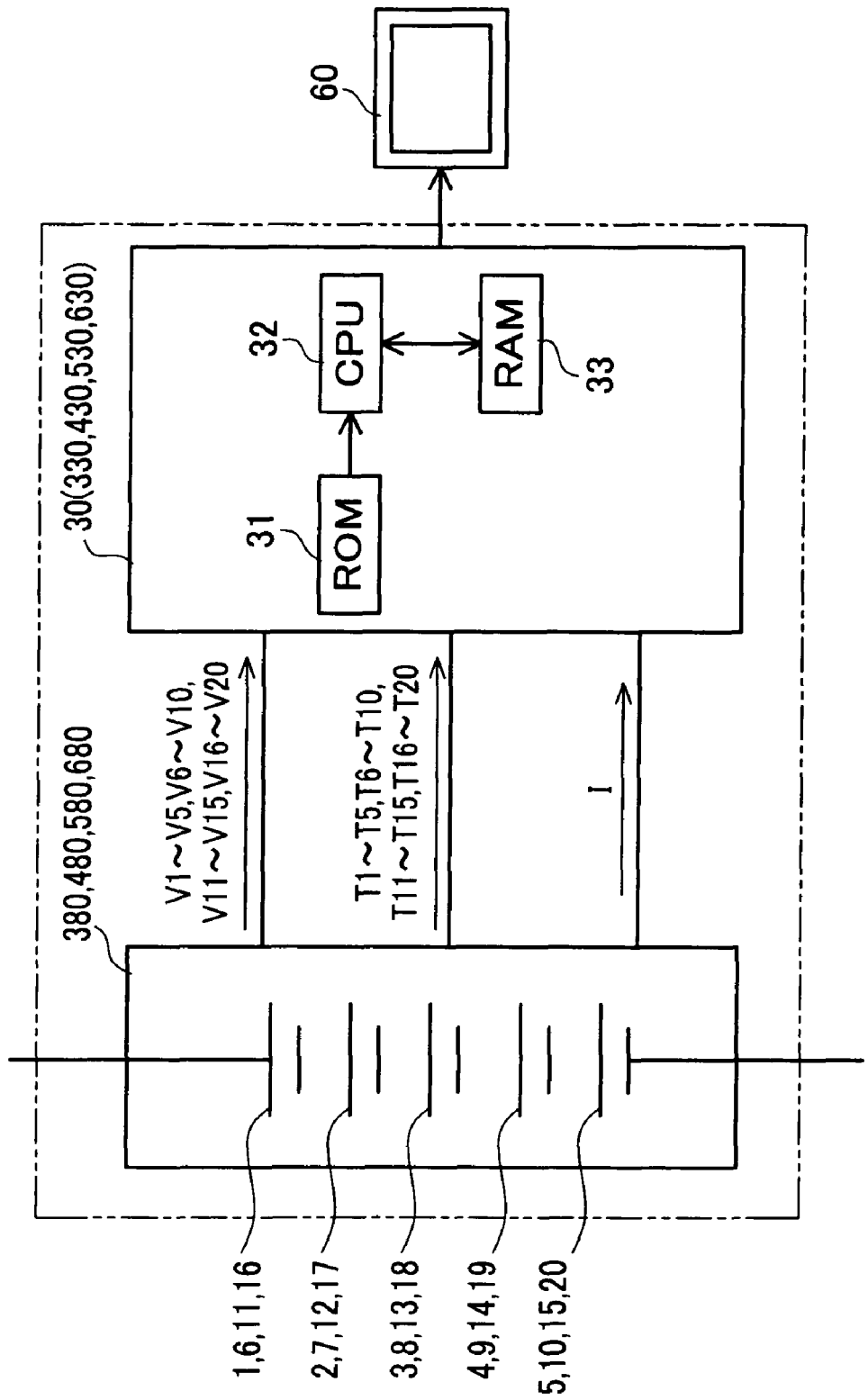
FIG. 5 is an explanatory view showing a process (obtaining process) for measuring a charge amount at reference time (a reference-time charge amount) of each used second battery constituting a used battery pack.
Figure 6:
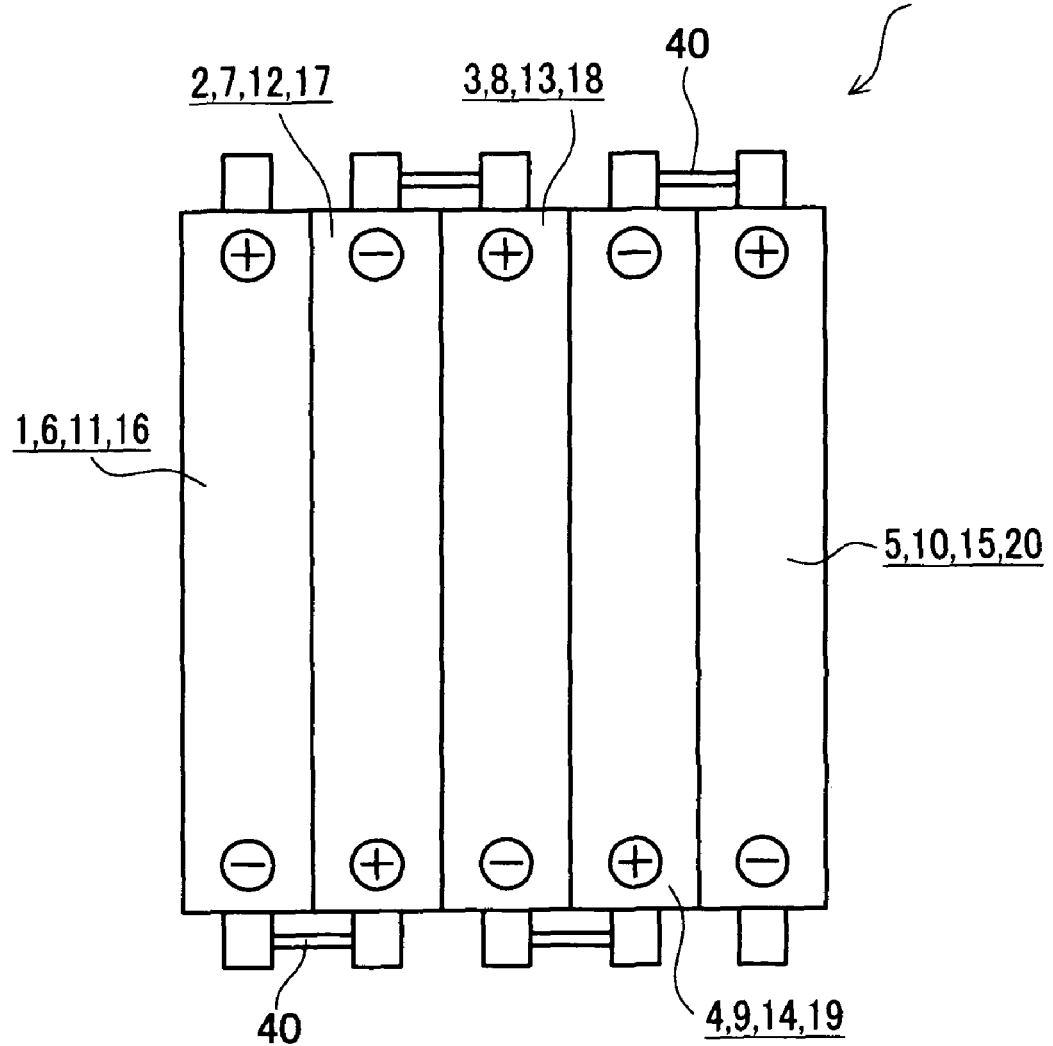
FIG. 6 is a top view of a used second battery.

As shown in FIG. 4, firstly, at step S1, a charge amount at reference time (hereinafter, a "reference-time charge amount") of each of used secondary batteries 1 to 5 (hereinafter, also referred to as simply "batteries") collected from the market to constitute a used battery pack 380 (see FIG. 6) is measured. To be more specific, as shown in FIG. 5, the used battery pack 380 and the battery controller 30 are combined and the used second batteries 1 to 5 are charged or discharged to adjust a representative SOC value to a "reference value (50% in the first embodiment)" under observation of the representative SOC data of the used battery pack 380 by use of the well known data monitor 60. The used second batteries 1 to 5 are then discharged at a predetermined current value until battery voltage becomes 1.0 V. A discharge electric quantity at that time is determined as a reference-time charge amount of each second battery 1 to 5. Similarly, the reference-time charge amounts of the used second batteries 6 to 10, 11 to 15, and 16 to 20 collected from the market to constitute used battery packs 480, 580, and 680 respectively are measured. Those results are shown in Table 1.

In the first embodiment, this step S1 corresponds to an obtaining process.

TABLE 1

| USED SECONDARY BATTERY | REFERENCE-TIME CHARGE AMOUNT (Ah) |
| --- | --- |
| 1 | 2.1 |
| 2 | 2.0 |
| 3 | 2.4 |
| 4 | 2.5 |
| 5 | 2.6 |
| 6 | 2.5 |
| 7 | 2.4 |
| 8 | 2.2 |
| 9 | 2.3 |
| 10 | 2.1 |
| 11 | 1.6 |
| 12 | 1.3 |
| 13 | 1.4 |
| 14 | 1.5 |
| 15 | 1.5 |
| 16 | 3.5 |
| 17 | 3.8 |
| 18 | 3.6 |
| 19 | 3.7 |
| 20 | 3.6 |

The used battery packs 380, 480, 580, and 680 are battery packs each of which is configured as with the reconstituted battery pack 80 such that the used second batteries 1 to 5, 6 to 10, 11 to 15, and 16 to 20 are arranged respectively in each row and electrically connected in series with the connection members 40.

The battery controller 30 is a battery controller (corresponding to a second charged-state control device) capable of controlling the charged state of each used battery pack 380 to 680 as well as the battery controllers 330 to 630 (corresponding to a first charged-state control device, see FIG. 5) which have ever controlled equally the charged states of the used battery packs 380 to 680 during use.

The battery controller 330 includes the ROM 31, the CPU 32, the RAM 33, and others (see FIG. 5) as with the battery controller 30 of the first embodiment. This battery controller 330 is configured to detect battery voltages V1 to V5, battery temperatures T1 to T5, and current value I of used secondary batteries 1 to 5 constituting the reconstituted battery pack 380 (the batteries 1 to 5 are connected in series and hence values of currents flowing in the batteries 1 to 5 are equal) as shown in FIG. 5. Based on these values, the SOC (State of Charge) of each battery 1 to 5 is estimated. An average of those SOCs is calculated as a representative SOC of the used battery pack 380. The battery controllers 430 to 630 also calculate respective representative SOCs of the used battery packs 480 to 680 in the same manner as the battery controller 330.

(Selecting Process)

At step S2 (see FIG. 4), from the used secondary batteries 1 to 20 whose reference-time charge amounts have been obtained, the batteries having the reference-time charge amounts close or similar to each other are selected to the number (five in the first embodiment) required for constituting the reconstituted battery pack 80. In the first embodiment, the batteries 3 and 7 each having a reference-time charge amount of 2.4 Ah, the batteries 4 and 6 each having a reference-time charge amount of 2.5 Ah, and the battery 5 having a reference-time charge amount of 2.6 Ah are selected.

In the first embodiment, particularly, the used secondary batteries 3 to 7 selected for constituting the reconstituted battery pack 80 mutually differ by 0.2 Ah (a maximum difference) in reference-time charge amount between the battery 5 with the largest reference-time charge amount and the batteries 3 and 7 with the smallest reference-time charge amount. In other words, the used secondary batteries for constituting the reconstituted battery pack 80 are selected so that the difference (the maximum difference) in reference-time charge amount between the largest reference-time charge amount (the battery 5; 2.6 Ah) and the smallest reference-time charge amount (the batteries 3 and 7; 2.4 Ah) falls within 10% of the smallest reference-time charge amount (in the first embodiment, about 8.3%=(2.6−2.4)/2.4).

In the first embodiment, this step S2 corresponds to the selecting process.

(Assembling Process)

At step S3, subsequently, the selected batteries 3 to 7 are arranged in a row as shown in FIG. 3. Specifically, the batteries 3 and 7 with the smallest reference-time charge amount among the batteries 3 to 7 are disposed so that the battery 3 is located at one end (a left end in FIG. 3) of the row in the reconstituted battery pack 80 and the battery 7 is located at the other end (a right end in FIG. 3) of the row in the reconstituted battery pack 80. The batteries 4 to 6 with the reference-time charge amount larger than those of the batteries 3 and 7 are disposed between the batteries 3 and 7.

Meanwhile, in the battery pack including the used secondary batteries arranged in a row as the reconstituted battery pack 80 of the first embodiment, the batteries located at both ends of the row are more likely to be cooled as compared with the batteries placed between them. Thus, both ends of the row of the reconstituted battery pack 80 are prone to become relatively lower in battery temperature during use and the middle of the row is apt to become relatively higher in battery temperature. The used secondary batteries positioned at both ends of the row are therefore slower in progress of deterioration by use as compared with the in-between used secondary batteries, and hence tend to be smaller in the decrease amount of the reference-time charge amount. In other words, the in-between used secondary batteries tend to be larger in the decrease amount of the reference-time charge amount by use as compared with the used secondary batteries positioned at both ends of the row.

In the first embodiment, on the other hand, as mentioned above, the selected batteries 3 to 7 are arranged so that the batteries 4 to 6 each having a relatively large reference-time charge amount are disposed in places of the reconstituted battery pack 80 where the battery temperature will become relatively high during use (in the middle of the row in the first embodiment) and the batteries 3 and 7 each having a relatively small reference-time charge amount are disposed in places of the reconstituted battery pack 80 where the battery temperature will become relatively low during use. By determining the arrangement of the batteries 3 to 7 in this manner, as the deterioration of the batteries 3 to 7 progresses as the reconstituted battery pack 80 is used or consumed, the difference in the reference-time charge amounts of the batteries 3 to 7 of the reconstituted battery pack 80 are expected to be further decreased. Accordingly, as the reconstituted battery pack 80 is used, defects such as overcharge or overdischarge in one or more of the used second batteries constituting the reconstituted battery pack can be further restrained and the performance of each used second battery of the reconstituted battery pack can be sufficiently exhibited.

Successively, as shown in FIG. 3, the batteries 3 to 7 arranged as above in one row were electrically connected in series in the numerical sequence by using connection members 40 having electric conductivity. Thus, the reconstituted battery pack 80 of the first embodiment was produced.

In the first embodiment, the step S3 corresponds to an assembling process.

The reconstituted battery pack 80 produced as above was then combined with the battery controller 30 to produce the controller-equipped reconstituted battery pack 50 (see FIG. 1).

In the ROM 31 of the battery controller 30, the full charge capacity values of the batteries 3 to 7 which have been measured separately by a well known technique are inputted in advance. Accordingly, the battery controller 30 may estimate the SOC value of each battery 3 to 7 by separately dividing the charge amounts of the batteries 3 to 7 estimated based on respective battery voltages V3 to V7, battery temperatures T3 to T7, and current I, by the full charge capacities of the batteries 3 to 7. Thus, an average of the estimated SOCs can be calculated as a representative SOC of the reconstituted battery pack 80.

Embodiment 2

Figure 2:
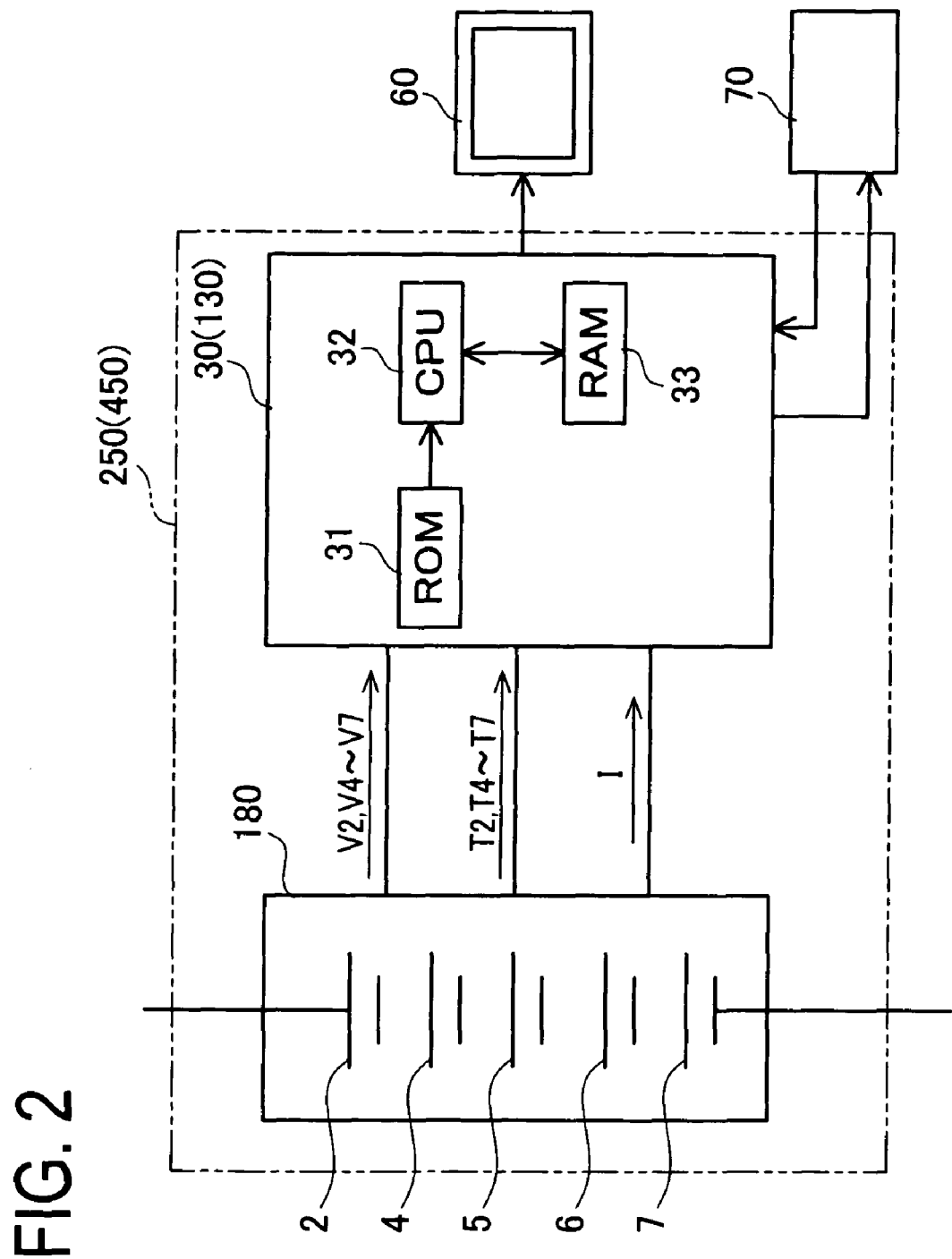
FIG. 2 is a block diagram of a reconstituted battery pack with controller in second and fourth embodiments.

A reconstituted battery pack equipped with a controller (a "controller-equipped reconstituted battery pack") 250 was produced as a second embodiment (see FIG. 2). This controller-equipped reconstituted battery pack 250 is similar to the controller-equipped reconstituted battery pack 50 of the first embodiment, except the reconstituted battery pack.

As shown in FIG. 3, a reconstituted battery pack 180 of the second embodiment is similar to the reconstituted battery pack 80 of the first embodiment except that the used second battery 2 is used instead of the used second battery 3.

The battery 2 has a reference-time charge amount of 2.0 Ah as shown in Table 1, which is smaller than that of the battery 3 (a reference-time charge amount of 2.4 Ah). Accordingly, the maximum difference in reference-time charge amount between the batteries 2, 4 to 7 constituting the reconstituted battery pack 180 of the second embodiment is 0.6 Ah (=2.6–2.0 Ah), which is larger than the value (0.2 Ah) in the first embodiment. Thus, the maximum difference (0.6 Ah) in reference-time charge amount is 30% of the reference-time charge amount (2.0 Ah) of the smallest reference-time charge amount (the battery 2) and larger than the value (about 8.3%) in the first embodiment.

Further, for comparison with the first and second embodiments, a controller-equipped reconstituted battery pack of a first comparative example was prepared. This controller-equipped reconstituted battery pack is similar to the controller-equipped reconstituted battery pack of the first embodiment except the reconstituted battery pack.

As shown in FIG. 3, a reconstituted battery pack 280 of the first comparative example is similar to the reconstituted battery pack 80 of the first embodiment except that the used second battery 11 is used instead of the used secondary battery 7.

The used second battery 11 has a reference-time charge amount of 1.6 Ah as shown in Table 1 which is smaller than that of the battery 7 (a reference-time charge amount of 2.4 Ah). Accordingly, the maximum difference in reference-time charge amount between the batteries 3 to 6 and 11 constituting the reconstituted battery pack 280 of the first comparative example is as large as 1.0 Ah (=2.6 Ah–1.6 Ah). In other words, the maximum difference (1.0 Ah) in reference-time charge amount is as large as 62.5% of the reference-time charge amount (1.6 Ah) of the battery (the battery 11) with the smallest reference-time charge amount.

An explanation is given by comparison to charging/discharging control of the controller-equipped reconstituted battery packs 50 and 250 of the first and second embodiments and charging/discharging control of the controller-equipped reconstituted battery pack of the first comparative example.

In the first and second embodiments and the first comparative example, as shown in FIGS. 7 to 12, the full charge capacity of each used second battery is indicated by the length of a rectangular bar, and each charge amount (SOC) is shown by hatching. A second comparative example mentioned later is similarly shown in FIG. 13.

Figure 7:
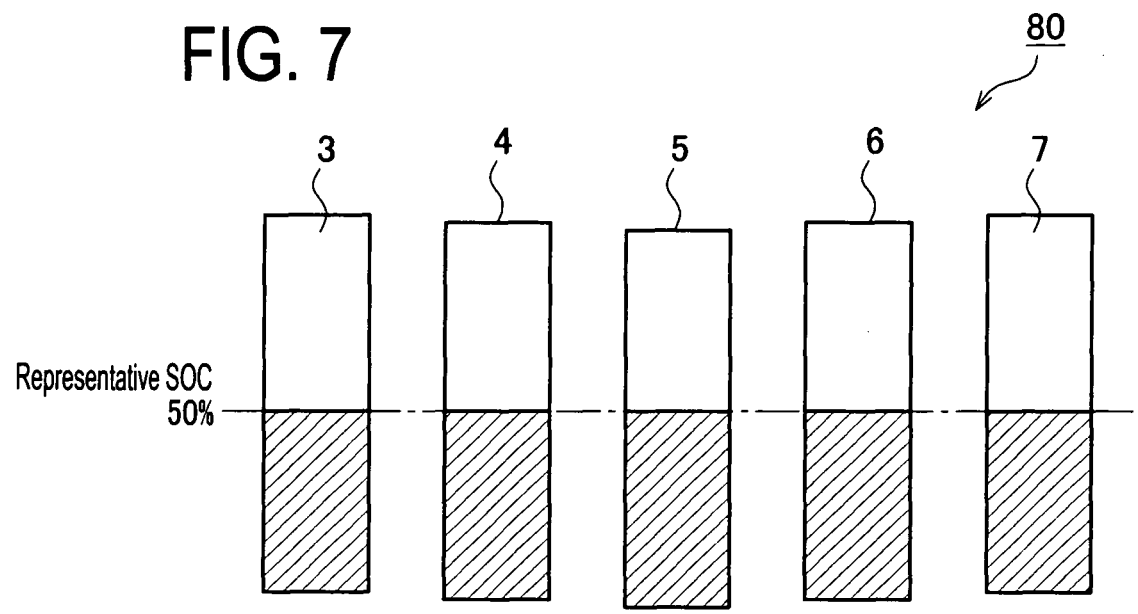
FIG. 7 is a schematic view showing a charged state of each used second battery with a representative SOC of 50% in the reconstituted battery pack.

In the first embodiment, the battery controller 30 controls a charged state of the reconstituted battery pack 80 with reference to the charged state corresponding to a representative SOC of 50% (see FIG. 7). When the control unit 70 (see FIG. 1) that performs various controls of a hybrid electric vehicle or the like issues a charge or discharge command, charging or discharging of the reconstituted battery pack 80 is started. In the reconstituted battery pack 80 of the first embodiment, the batteries 3 to 7 are electrically connected in series. Those batteries 3 to 7 are thus charged or discharged respectively by an equal electric quantity.

At that time, the battery controller 30 estimates the SOC of each battery 3 to 7 and calculates a representative SOC from an average of the estimated SOCs. The battery controller 30 then controls the charged state of the reconstituted battery pack 80 to cause a representative SOC to approach 50% (the reference value).

In the controller-equipped reconstituted battery pack 250 of the second embodiment, with reference to the charged state corresponding to a representative SOC of 50% (see FIG. 9), the charged state of the reconstituted battery pack 180 is also controlled by the battery controller 30 in a similar manner as in the first embodiment.

Even in the controller-equipped reconstituted battery pack of the comparative example, the battery controller 30 controls the charged state of the reconstituted battery pack 280 in a similar manner as in the first example with reference to the charged state corresponding to a representative SOC of 50% (see FIG. 11) as in the first embodiment.

Here, the case is assumed where the reconstituted battery packs 80 and 180 of the first and second embodiments are discharged until the representative SOC comes to 10%.

When the reconstituted battery pack 280 of the first comparative example is discharged until the representative SOC comes down to 10%, as shown in FIG. 12, the battery 11 with the smallest reference-time charge amount is overdischarged by an electric quantity QH (about 0.2 Ah in this example). This leads to an undesirable result that the inner pressure of the battery 11 extremely rises.

Thereafter, the battery controller 30 executes the control of giving more charge than discharge to cause the representative SOC to approach 50% (the reference value).

Figure 8:
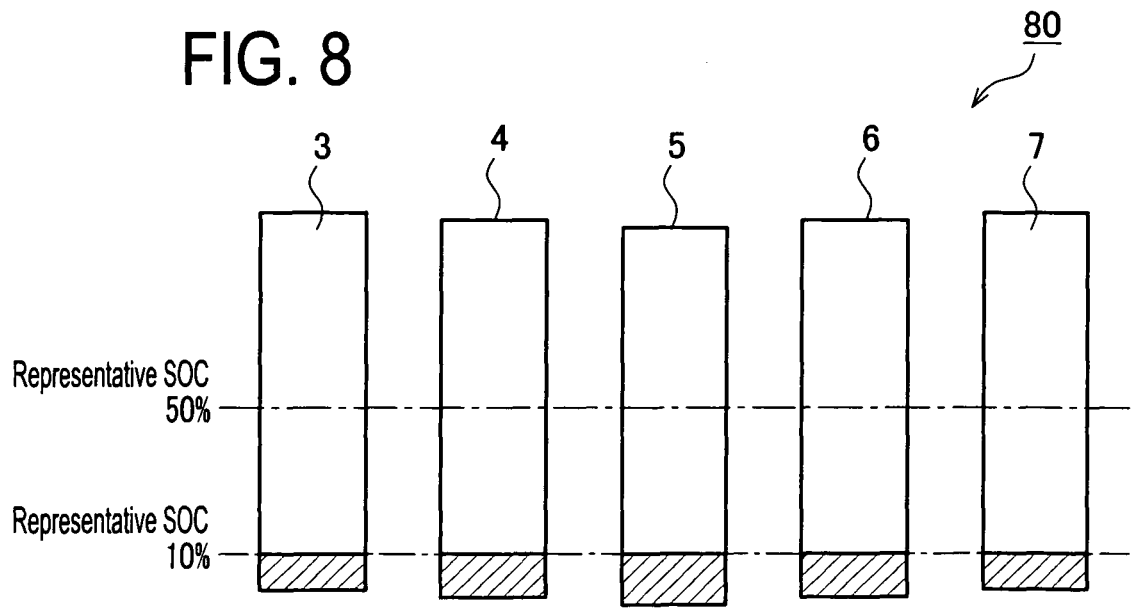
FIG. 8 is a schematic view showing a charged state of each used secondary battery constituting the reconstituted battery pack when discharged until the representative SOC comes to 10%.

On the other hand, even when the reconstituted battery pack 80 of the first embodiment is discharged until the representative SOC comes down to 10%, any of the batteries 3 to 7 are not overcharged as shown in FIG. 8.

This is because, in the first embodiment, the batteries 3 to 7 close to each other in reference-time charge amount are selected from a group of the batteries 1 to 20 whose reference-time charge amounts have been obtained and the selected batteries 3 to 7 are recombined to assemble the reconstituted battery pack 80 as mentioned above. In particular, the maximum difference in reference-time charge amount between the batteries 3 to 7 constituting the reconstituted battery pack 80 falls within 10% (about 8.3% in the first embodiment) of the reference-time charge amount of the battery (the batteries 3 and 7) with the smallest reference-time charge amount.

By such combination of the used second batteries 3 to 7 with a small difference in reference-time charge amount can reduce a difference in charge amount (residual electric quantity) between the batteries 3 to 7 during discharging. This is because the charge amounts of the batteries 3 to 7 constituting the reconstituted battery pack 80 will vary in a range centering on the reference-time charge amount.

After that, the battery controller 30 executes the control of giving more charge than discharge to cause the representative SOC to approach 50% (the reference value).

Similarly, even when the reconstituted battery pack 180 of the second embodiment is discharged until the representative SOC comes down to 10%, any of the batteries 2 and 4 to 7 are not overcharged as shown in FIG. 10.

This is because, in the second embodiment, the batteries 2 and 4 to 7 close to each other in reference-time charge amount are selected from the group of the batteries 1 to 20 whose reference-time charge amounts have been obtained and the selected batteries 2 and 4 to 7 are recombined to assemble the reconstituted battery pack 180 as mentioned above. For details, the maximum difference in reference-time charge amount between the batteries 2 and 4 to 7 constituting the reconstituted battery pack 180 is 30% or less (30% in the second embodiment) of the reference-time charge amount of the battery (the battery 2) with the smallest reference-time charge amount.

By such combination of the used second batteries 2 and 4 to 7 with a small difference in reference-time charge amount can reduce a difference in charge amount (residual electric quantity) between the batteries 2 and 4 to 7 during discharging. This is because the charge amounts of the batteries 2 and 4 to 7 constituting the reconstituted battery pack 180 will vary in a range centering on the reference-time charge amount.

After that, the battery controller 30 executes the control of giving more charge than discharge to cause the representative SOC to approach 50% (the reference value).

As described above, the controller-equipped reconstituted battery pack 50 (the reconstituted battery pack 80) of the first embodiment can restrain defects such as overcharge in one or more of the used second batteries 3 to 7 constituting the reconstituted battery pack 80. Furthermore, the battery controller-equipped reconstituted battery pack 250 (the reconstituted battery pack 180) of the second embodiment also can restrain defects such as overcharge in one or more of the used second batteries 2 and 4 to 7 constituting the reconstituted battery pack 180.

Since the used second batteries for constituting the reconstituted battery pack so that the maximum difference in reference-time charge amount between the batteries is within 30% of the reference-time charge amount of the battery with the smallest reference-time charge amount, preferably, within 10%, it is accordingly expected to restrain defects such as overdischarge in one or more of the used second batteries constituting the reconstituted battery pack.

Embodiment 3

A reconstituted battery pack equipped with a controller ("controller-equipped reconstituted battery pack") 150 of a third embodiment is similar to the controller-equipped reconstituted battery pack 50 of the first embodiment except that the battery controller 130 is used instead of the battery controller 30.

The battery controller 130 of the third embodiment is configured, as with the battery controller 30 of the first embodiment, to detect battery voltages V3 to V7, battery temperatures T3 to T7, and current value I of used secondary batteries 3 to 7 constituting the reconstituted battery pack 80 (see FIG. 1). Based on those values, the SOC of each battery 3 to 7 is estimated and an average of the estimated SOCs is calculated as a representative SOC of the reconstituted battery pack 80.

This battery controller 130 is a battery controller (a third charged-state control device) capable of controlling the charged state of the reconstituted battery pack 80 as with the battery controller 30. In other words, the battery controller 130 calculates the representative SOC in the same manner as the battery controller 30 of the first embodiment and controls the charged state of the reconstituted battery pack 80 so that the representative SOC becomes the reference value (50%) equivalent to that in the battery controller 30 of the first embodiment. The battery controller 130 of the third embodiment differs from the battery controller 30 of the first embodiment in that the controller 130 has the function of preventing overcharge and overdischarge of the batteries 3 to 7.

Embodiment 4

A reconstituted battery pack equipped with a controller ("controller-equipped reconstituted battery pack") 450 was produced as a fourth embodiment as shown in FIG. 2. This controller-equipped reconstituted battery pack 450 is similar to the controller-equipped reconstituted battery pack 150 of the third embodiment except that the reconstituted battery pack 180 (which is identical to that of the second embodiment; see FIG. 3) is used instead of the reconstituted battery pack 80. The configuration of the reconstituted battery pack 180 is as explained in the aforementioned second embodiment.

For comparison with the third and fourth embodiments, a controller-equipped reconstituted battery pack of a second comparative example was prepared. This controller-equipped reconstituted battery pack is similar to the controller-equipped reconstituted battery pack 150 of the third embodiment except that the reconstituted battery pack 280 (which is identical to that of the first comparative example; see FIG. 3) is used instead of the reconstituted battery pack 80. The configuration of the reconstituted battery pack 280 is as explained in the aforementioned first comparative example.

An explanation is given by comparison to charging/discharging control of the controller-equipped reconstituted battery packs 150 and 450 of the third and fourth embodiments and charging/discharging control of the controller-equipped reconstituted battery pack of the second comparative example.

In the third embodiment, the battery controller 130 controls the charged state of the reconstituted battery pack 80 with reference to the charged state corresponding to a representative SOC of 50% (see FIG. 7) as in the first embodiment. Specifically, when the representative SOC increases or decreases away from 50% by charging or discharging, the charged state of the reconstituted battery pack 80 is controlled to cause the representative SOC to approach 50% (the reference value).

In the controller-equipped reconstituted battery packs 450 of the fourth embodiment, similarly, the battery controller 130 controls the charged state of the reconstituted battery pack 180 with reference to the charged state (see FIG. 9) corresponding to a representative SOC of 50% in the same manner as in the third embodiment.

In the controller-equipped reconstituted battery packs of the second comparative embodiment, similarly, the battery controller 130 controls the charged state of the reconstituted battery pack 280 with reference to the charged state (see FIG. 11) corresponding to a representative SOC of 50% in the same manner as in the third embodiment.

Here, the case is assumed where the reconstituted battery packs 80 and 180 of the third and fourth embodiments and the reconstituted battery pack 280 of the second comparative example are discharged until the representative SOC comes to 10%.

When the reconstituted battery pack 280 of the second comparative example is discharged, as shown in FIG. 13, the estimated SOC of the battery 11 with the smallest reference-time charge amount becomes 0% before the representative SOC becomes 10%. If the battery controller 130 determines that the estimated SOC of the used second battery 11 becomes 0%, therefore, it forcibly stops the discharging of the reconstituted battery pack 280. This makes it possible to prevent overdischarge of the battery 11.

However, as to the other used second batteries 3 to 6, they are not allowed to discharge any more even though they can be discharged until the representative SOC becomes 10%. To be concrete, the discharge electric quantity of each battery is smaller by an electric quantity QH (about 0.3 Ah in the present embodiment) than a discharge electric quantity QK achieved if every battery is discharged until the representative SOC comes down from 50% to 10%. In the second comparative example, due to the used second battery 11 with the smallest reference-time charge amount, the discharge of the other used second batteries 3 to 6 is restricted, leading to restriction in available electric quantity.

In the controller-equipped battery pack 150 of the third embodiment, on the other hand, any of the used second batteries 3 to 7 constituting the reconstituted battery pack 80 can be discharged until the representative SOC comes down to 10% as shown in FIG. 8.

This is because, as mentioned above, the used second batteries 3 to 7 close to each other in reference-time charge amount are selected from a group of the used second batteries 1 to 20 whose reference-time charge amounts have been obtained and the selected batteries 3 to 7 are recombined to assemble the reconstituted battery pack 80. In particular, the above advantage can be achieved because the used secondary batteries 3 to 7 are selected so that the maximum difference in reference-time charge amount between the batteries 3 to 7 constituting the reconstituted battery pack 80 falls within 10% (about 8.3% in the third embodiment) of the reference-time charge amount of the battery (the batteries 3 and 7) with the smallest reference-time charge amount.

By such combination of the used second batteries 3 to 7 with a small difference in reference-time charge amount, the difference in charge amount between the batteries 3 to 7 during discharging can be reduced. This makes it possible to prevent the estimated SOC of any one or more of the used second batteries from becoming 0% before the representative SOC becomes 10%.

Subsequently, the battery controller 130 executes the control of giving more charge than discharge to cause the representative SOC to approach 50% (the reference value).

In the controller-equipped battery pack 450 of the fourth embodiment, similarly, any of the used second batteries 2 and 4 to 7 constituting the reconstituted battery pack 180 can be discharged until the representative SOC becomes 10% as shown in FIG. 10.

This is because, as mentioned above, the used second batteries 2 and 4 to 7 close to each other in reference-time charge amount are selected from a group of the used second batteries 1 to 20 whose reference-time charge amounts have been obtained and the selected batteries 2 and 4 to 7 are recombined to assemble the reconstituted battery pack 180. For details, the maximum difference in reference-time charge amount between the used second batteries 2 and 4 to 7 constituting the reconstituted battery pack 180 is 30% or less (30% in the fourth embodiment) of the reference-time charge amount of the battery (the battery 2) with the smallest reference-time charge amount.

By such combination of the used second batteries 2 and 4 to 7 with a small difference in reference-time charge amount can reduce a difference in charge amount between the batteries 2 and 4 to 7 during discharging. It is thus possible to prevent the estimated SOC of any one of the used second batteries becomes 0% before the representative SOC becomes 10%.

Then, the battery controller 130 executes the control of giving more charge than discharge to cause the representative SOC to approach 50% (the reference value).

As described above, the controller-equipped reconstituted battery packs 150 and 450 of the third and fourth embodiments (the reconstituted battery packs 80 and 180) can restrain defects that any of the used second batteries constituting the reconstituted battery pack restricts the charging/discharging of the other used second batteries, leading to restricted available electric quantity. Accordingly, the performance of each used second battery constituting the reconstituted battery packs 80 and 180 can be sufficiently exhibited.

In other words, since the maximum difference in reference-time charge amount between the used second batteries constituting the reconstituted battery pack falls within 30% of the reference-time charge amount of the battery with the smallest reference-time charge amount, preferably, within 10%, the performance of each used second battery constituting the reconstituted battery pack can be sufficiently provided.

The invention is described as above along the first to fourth embodiments but it is not limited thereto. The invention may be embodied in other specific forms without departing from the essential characteristics thereof.

For instance, each of the reconstituted battery packs 80 and 180 in the first to fourth embodiments includes five used secondary batteries (the used secondary batteries 3 to 7 or the used second batteries 2 and 4 to 7). However, the used secondary batteries constituting each reconstituted battery pack are not limited in number if only it is more than one.

The used secondary batteries 3 to 7 or the used second batteries 2 and 4 to 7 are electrically connected in series to form the reconstituted battery pack 80 or 180 in the first to fourth embodiments. The present invention can further be applied to a reconstituted battery pack in which a plurality of used secondary batteries is electrically connected in parallel.

The used secondary batteries 3 to 7 or the used second batteries 2 and 4 to 7 are arranged in a row to constitute the reconstituted battery pack 80 or 180 in the first to fourth embodiments. However, the arrangement of the used secondary batteries constituting the reconstituted battery pack may be any pattern.

In the first embodiment, the battery controller 30 (corresponding to the second charged-state control device) is used to measure the reference-time charge amount of each of the used battery packs 380 to 680. Alternatively, any one of the battery controllers 330 to 630 (corresponding to the first charged amount control device) that controls the charged state of each used battery pack 380 to 680 during use may be used.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method of producing a reconstituted battery pack, comprising:
    obtaining a reference-time charge amount charged in each of used secondary batteries constituting a used battery pack when a representative state of charge of the used battery pack is controlled to a predetermined reference value with use of a charged-state control device programmed to calculate the representative SOC estimated to be representative of SOCs of used secondary batteries constituting the used battery pack, and programmed to control a charged state of the used battery pack so that the representative SOC becomes the predetermined reference value, the charged-state control device being one of a first charged-state control device having ever controlled the charged state of a used battery pack when this used battery pack was used before, and a second charged-state control device programmed to control the charged state of the used battery pack as with the first charged-state control device;
    selecting more than one of the used secondary batteries close to each other in the reference-time charge amount from a group of the used secondary batteries used in one or more of the used battery packs, the reference-time charge amount of each used secondary battery having been obtained; and
    combining and assembling the selected used secondary batteries into a new reconstituted battery pack, wherein the selecting includes selecting the used secondary batteries so that a difference in the reference-time charge amount between a largest one and a smallest one of the reference-time charge amounts of the selected used secondary batteries falls within 30% of the smallest reference-time charge amount.

2. The reconstituted battery pack producing method according to claim 1, wherein
    the new reconstituted battery pack assembled in the assembling is reconstituted battery pack that will be used under control by any one of the first charged-state control device, the second charged-state control device, and a third charged-state control device programmed to control a charged state of the new reconstituted battery pack as with the first and second charged-state control devices.

3. A reconstituted battery pack including a plurality of used secondary batteries having ever been used and being recombined, wherein
    when the reconstituted battery pack is controlled by use of a charged-state control device programmed to calculate a representative state of charge (SOC) estimated to be representative of SOCs of used secondary batteries constituting the reconstituted battery pack, and programmed to control a charged state of the reconstituted battery pack so that the representative SOC becomes a predetermined reference value,
    as to reference-time charge amounts charged in the used secondary batteries constituting the reconstituted battery pack when the representative SOC becomes the reference value,
    a difference in reference-time charge amount between a used secondary battery with a largest reference-time charge amount and a used secondary battery with a smallest reference-time charge amount among the used secondary batteries falls within 30% of the smallest reference-time charge amount.

4. A method of providing an energy source, comprising
    providing the reconstituted battery pack according to claim 3; and
    controlling a charged state of the reconstituted battery pack by the charged-state control device when using the reconstituted battery pack.

5. A reconstituted battery pack control system comprising:
    a reconstituted battery pack including a plurality of used secondary batteries having ever been used and being recombined; and
    a charged-state control device programmed to calculate a representative state of charge (SOC) estimated to be representative of SOCs of the used secondary batteries constituting the battery pack, and programmed to control a charged state of the reconstituted battery pack so that the representative SOC becomes a predetermined reference value, wherein
    when the reconstituted battery pack is controlled by use of the charged-state control device so that the representative SOC becomes the reference value,
    as to reference-time charge amounts charged in the used secondary batteries constituting the reconstituted battery pack, and
    a difference in reference-time charge amount between a used secondary battery with a largest reference-time charge amount and a used secondary battery with a smallest reference-time charge amount among the used secondary batteries falls within 30% of the smallest reference-time charge amount.

* * * * *